Oct. 19, 1965    J. PICKLES    3,212,828
VEHICLE SEAT TRACK CONSTRUCTION FOR USE WITH SEAT BELTS
Filed Nov. 26, 1963    3 Sheets-Sheet 1
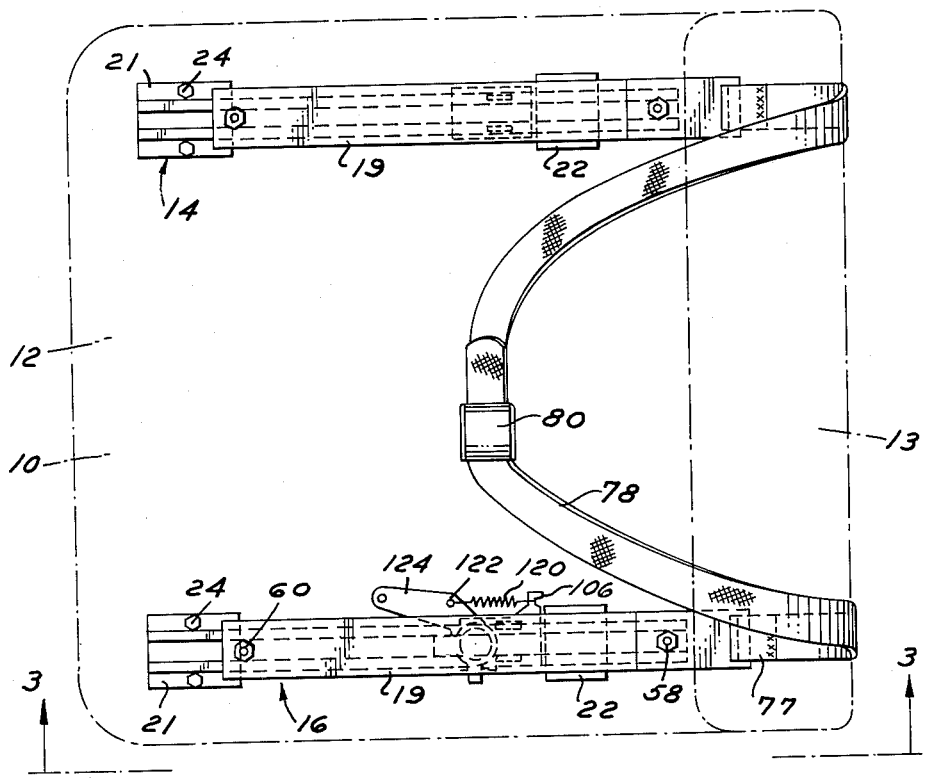
INVENTOR.
JOSEPH PICKLES
BY
*Whittemore, Hulbert*
*& Belknap*
ATTORNEYS

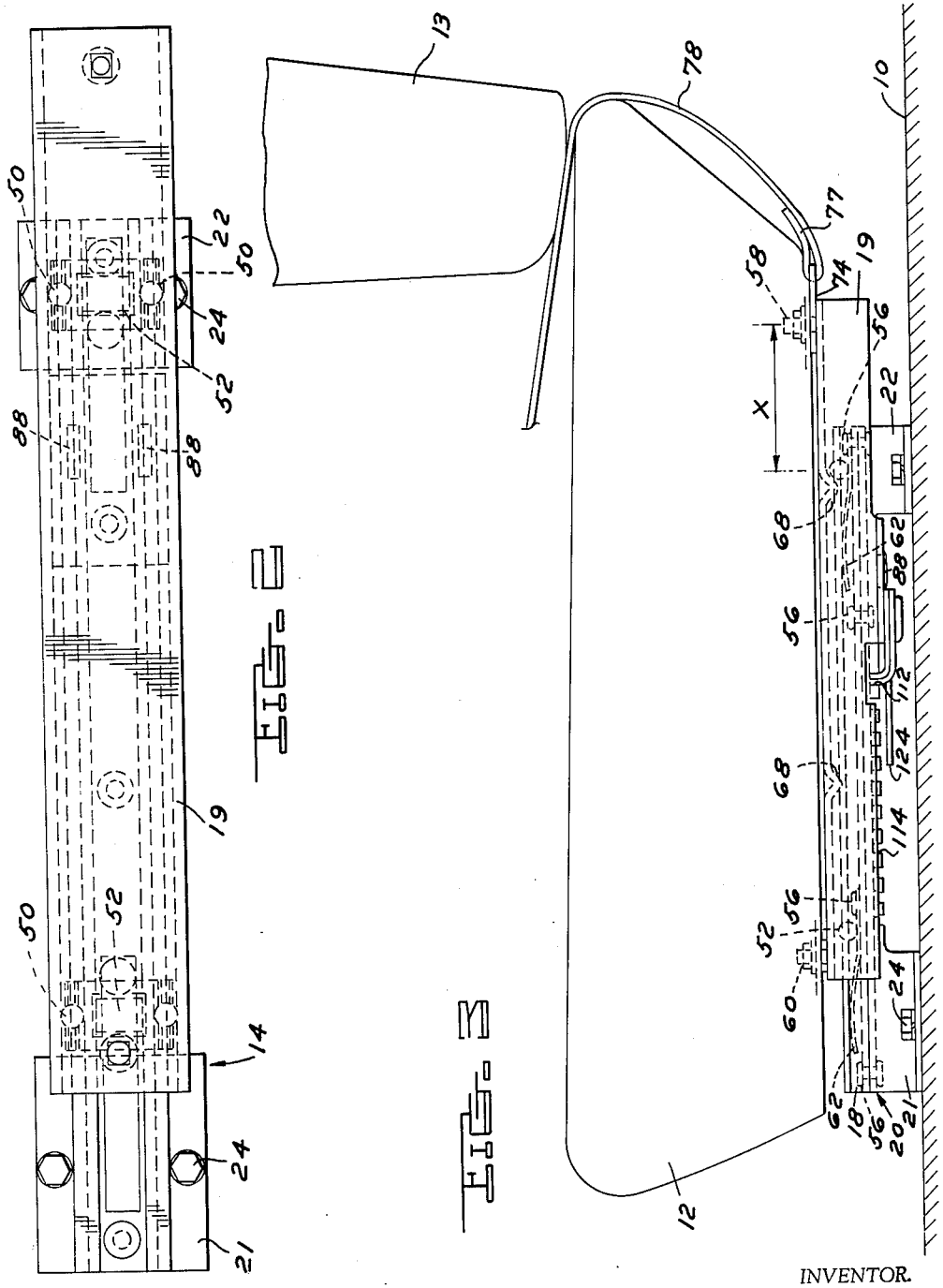

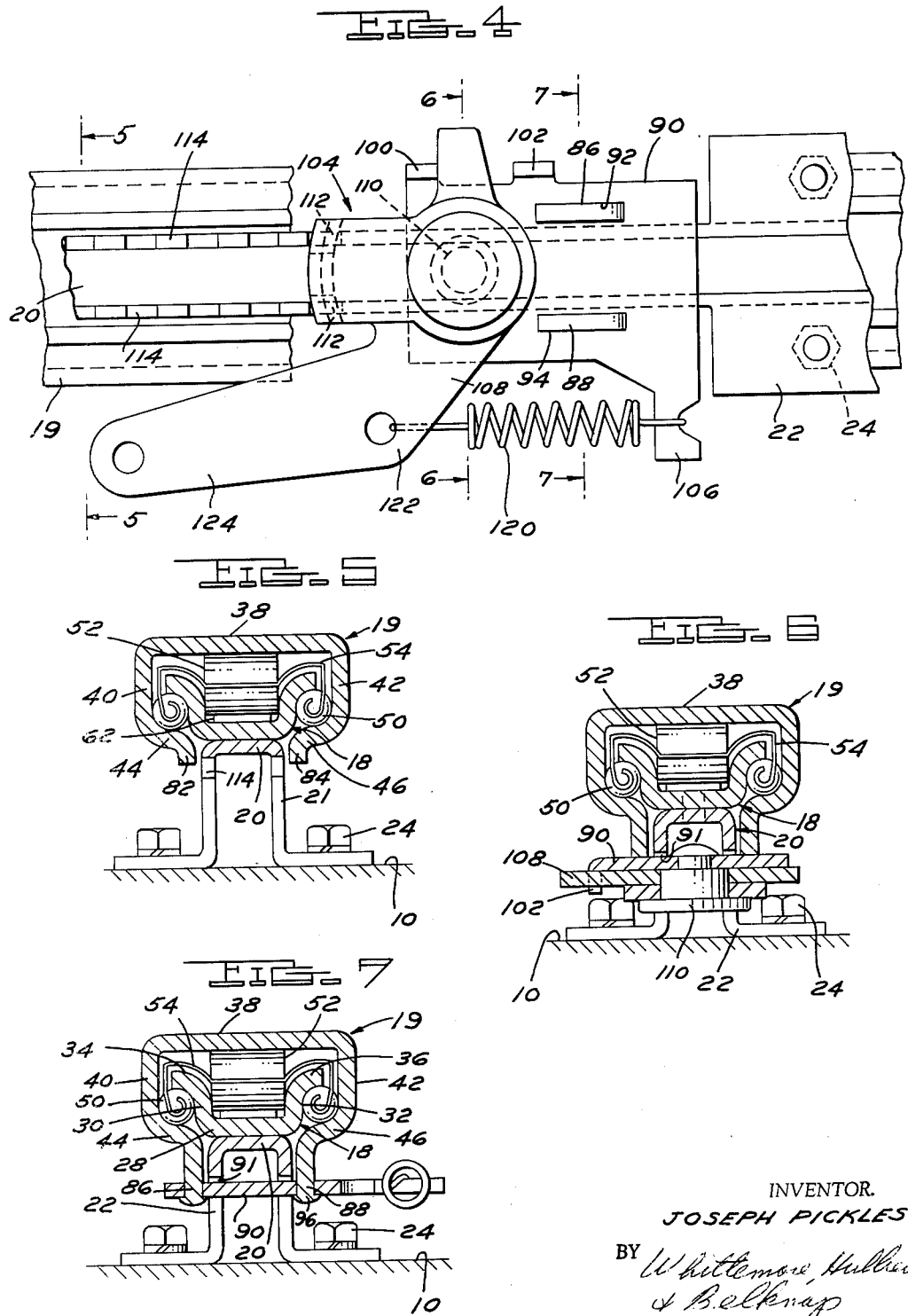

United States Patent Office 3,212,828
Patented Oct. 19, 1965

3,212,828
VEHICLE SEAT TRACK CONSTRUCTION FOR USE WITH SEAT BELTS
Joseph Pickles, Dearborn, Mich., assignor to Ferro Manufacturing Corporation, a corporation of Michigan
Filed Nov. 26, 1963, Ser. No. 326,166
7 Claims. (Cl. 308—3.8)

The present invention relates to adjustable seats for automobiles and relates more particularly to a seat adjuster mechanism having a pair of slidable track units supporting the vehicle seat for fore and aft movements.

Seat adjuster mechanisms embodying slidable track units providing for fore and aft adjustment and positioning of the seat are well-known in the art. Each slidable track unit generally comprises a pair of substantially U-shaped track or channel members, one invertedly encompassing the other. The track or channel members are provided with laterally extending race forming flanges thereon in complementary relationship to each other. A bearing element, usually a small diameter ball, is interposed between each pair of flanges to provide lateral bearing means between the track members. A central bearing element, a ball or roller somewhat larger in size than the lateral bearing elements, is interposed between the opposed base portions of the track members. Generally, the side bearing elements and the center enlarged bearing elements are maintained in a predetermined relationship with one another by a suitable cage device. One of these bearing element assemblies is positioned at each end of the track unit.

In a conventional structure the center bearing element or ball while rolling on the lower track member supports the vertical load of the vehicle seat and its occupants, while the lateral bearing elements or balls merely provide lateral stability. The conventional seat adjuster mechanism is also usually designed to provide a predetermined definite preloading of the structure to permit the seat to operate throughout its normal life without excessive rattling.

A cooperating pair of seat track units of the present invention is designed primarily to provide a sufficiently strong connection between the stationary members or tracks and the movable members or tracks to permit connection of a seat belt to the cooperating units rather than to the floor or body of the vehicle as is presently the case.

It should be appreciated when the seat is occupied, with the seat belt firmly around the occupant, that when an emergency situation arises, the seat belt is designed to hold the occupant tightly and firmly against the seat so as to avoid serious injury. As a result of the excessive loading created on the seat adjuster assembly during an emergency situation, it has been found that the upper track members separate from the lower track members. As a result thereof a person utilizing a seat belt may still be subjected to undesirable injuries due to the separation of the upper track members from the lower track members. With the present invention each seat track unit utilizes a closure plate closely adjacent the place where the maximum moment occurs to prevent the track or channel members from separating when under load.

It is another object of the present invention to provide a seat track unit comprising an upper and a lower channel member, said upper channel member invertedly encompassing the lower channel member with their base portions in opposed spaced relationship, anti-friction means provided between the channel members to permit lengthwise movement of the upper channel member with respect to the lower channel member, the flanges on the upper channel member extending downwardly beyond the bottom of the lower channel member, and a laterally extending closure plate extending across the bottom of the channel members at the back end portion thereof and secured to the flanges on the upper channel member, said closure plate preventing the flanges of the upper channel member from separating when the unit is subjected to an emergency load so as to maintain the tracks in assembled relationship, said closure plate being movable with the upper channel member without any obstruction from the lower channel member.

Another object of the present invention is to provide a seat track unit of the aforementioned type wherein latch means is carried by the closure plate engageable with the lower channel member to secure the members in a selected adjusted position.

A further object of the present invention is to provide a seat track unit of the aforementioned type wherein anchor means is carried by the upper channel member adjacent the back end thereof for mounting a seat belt.

A still further object of the present invention is to provide a seat track unit of the aforementioned type wherein the closure plate is located closely adjacent the back end of the upper channel member where the maximum moment occurs, said closure plate being spaced from the bottom of the lower channel member.

It is thus another object of the present invention to provide a simplified, low-cost structure of the aforementioned type having certain advantages contributing to efficiency, reliability and long life, as well as ease of maintenance.

Further objects and advantages of the present invention will be apparent from the following description, reference being had to the accompanying drawings wherein a preferred form of the present invention is clearly shown.

FIGURE 1 is a plan view of the seat track assembly with certain parts removed so as to more adequately illustrate features of the invention.

FIGURE 2 is a plan view of the right hand seat track unit illustrated in FIGURE 1 but on a somewhat larger scale.

FIGURE 3 is an elevational view looking in the direction of arrows 3—3 in FIGURE 1.

FIGURE 4 is a bottom view of the left hand seat track unit illustrated in FIGURE 1.

FIGURE 5 is a sectional view taken substantially on the line 5—5 of FIGURE 4.

FIGURE 6 is a sectional view taken substantially on the line 6—6 of FIGURE 4.

FIGURE 7 is a sectional view taken substantially on the line 7—7 of FIGURE 4.

Referring now to the drawings, the floor of the vehicle is designated by the numeral 10. A seat 12 having a back 13 is adjustably supported upon the floor 10 by a seat adjuster mechanism. The seat adjuster mechanism or assembly comprises two spaced seat track units 14 and 16 secured to the floor and arranged in the manner shown in the plan view in FIGURE 1, so that one unit is arranged beneath each end of the seat 10. Since the two seat track units 14 and 16 are similar to each other in construction, a detailed description of one will suffice and the description will be directed to the left hand seat track unit 16 which is provided with the latching means by which the movable tracks or carriages of both units are normally held against lengthwise movement. Means, not shown, are provided for effecting identical movements of the movable parts of the two units or devices so that both ends of the seat are adjusted identically and simultaneously. Although this invention will be described in effecting front to rear adjustment of the seat 10, it should be understood that it has utility with a 4-way or a 6-way seat adjusting mechanism.

In general, the seat track unit 16 comprises a lower track or channel member 18 and an upper track member or slide 19. The lower channel member 18 is fixedly mounted at opposite end portions thereof to a fixed support 20 which is provided with legs 21 and 22 at opposite ends thereof which in turn are secured to the floor 10 by bolts 24. Each of the track members 18 and 19 is a substantially U-shaped channel member. The lower track member 18 is provided with a base portion 28 and upwardly extending leg portions 30 and 32 at each side of the base portion. Each of the leg portions 30 and 32 terminates in a laterally extending, outwardly curved flange 34 and 36, respectively.

The upper track member 19 is provided with a base portion 38 and downwardly depending leg portions 40 and 42 at each side thereof. Each of the leg portions 40 and 42 includes a laterally extending but inwardly curved flange portion 44 and 46, respectively.

As seen in FIGURES 5–7, the upper track member 19 invertedly encompasses the lower track member 18. Each pair of flanges 34–44 and 36–46 are complementally curved to form races receiving bearing elements in the form of small balls 50. In a conventional seat track structure the function of the small balls 50 is to provide lateral bearing means between the channel members or track members 18 and 19, and, thus, to control the lateral stability of the seat track unit.

The vertical load on the upper seat track 19 is transmitted to the lower track 18 through bearing elements in the form of rollers 52 somewhat larger in diameter than the balls 50. Each pair of side balls 50 and associated centrally positioned rollers 52 are retained in predetermined lateral position or alignment by means of a bearing cage 54 of any convenient form. It will be understood that there are generally two ball and cage assemblies, one located at each end of the track unit.

The lower track 18 is connected to the elongated fixed support 20 by means of two pairs of rivets 56 which form roller stops as will subsequently be described. The upper track 19 or slide is provided with the necessary retaining device 58 at the rear thereof and the necessary retaining device 60 at the front thereof for supporting and securing the frame of the vehicle seat 10 as best illustrated in FIGURE 3.

It should be noted that wear strips 62 are provided on which the rollers 52 are adapted to roll. Each of the wear strips 62 is located intermediate a pair of rivets 56 located at one of the end portions of the lower track member 18. Each of the wear strips 62 is an elongated member, made of a resilient material such as spring steel. The rear wear strip is preferably anchored at only one end by the outermost rivet or stud 56 securing the track member 18 to the elongated fixed support 20. The front wear strip is secured on the back end thereof by the innermost rivet or stud 56 of the other pair of rivets. The wear strips 62 provide a wear resistance surface for the rollers 52.

The upper channel member 19 is provided with semispherical knolls 68. The knolls 68 act as stops which in part control the range of movement of the upper track member 13 over the rollers 52. In this regard, it will be noted that the four studs or rivets 56 securing the lower track 18 to the elongated fixed support 20 are provided with enlarged head portions effective to limit the distance each roller 52 may roll relative to the lower track 18.

A plate or bracket 74 is carried by the retaining device 58 which includes a mounting stud and lock nut. The bracket 74 extends rearwardly and is provided with a slot which receives one end 77 of the seat belt 78. The end 77 is secured to the other portion of the belt 78 by stitching or other fastening means. The other end of the seat belt 78 is fastened in like manner to the upper channel member 19 on the unit 14. The seat belt 78 is divided in the middle to form two parts so as to permit the belt 78 to be secured around the occupant of the seat and includes a suitable fastening device 80 which connects the two parts of the belt 78 together as is well known in the art.

It will be appreciated that when an emergency situation arises, the purpose of the seat belt is to hold the person in the seat so as to prevent or limit serious personal injury. It has also been found through experience when a seat belt is mounted on the pair of seat track units in the manner just described that when an emergency occurs, the flanges 40 and 42 of the upper channel members 19 are moved outwardly so as to separate from the lower channel. As a result thereof the upper track or channel member 19 separates from the lower channel member 18 with the result that the occupant is thrown forward towards the windshield of the automobile. Thus, the person could be seriously injured although initial precaution had been taken to fix the seat belt about the body of the person.

In the present invention each track 14 and 16 is provided with a closure plate which is located closely adjacent the place where the maximum moment occurs so as to prevent the track or channel members from separating when under extreme or dangerous load. The maximum moment occurs on each track unit when the seat 12 is in the rearward position illustrated in FIGURE 3. The maximum moment occurs between the fastening device 58 to which the seat belt 78 is connected and the adjacent pair of balls or bearing elements 50. The distance for the maximum moment is indicated by the letter "X" in FIGURE 3.

The curved flange portions 44 and 46 provided on the upper track member 19 terminate in vertically arranged extensions 82 and 84 as best illustrated in FIGURE 5. The extensions 82 and 84 vary in height such that parts thereof are provided with lugs 86 and 88 respectively as best illustrated in FIGURES 4 and 7. A closure plate 90 of substantially uniform thickness is provided with elongated openings 92 and 94 which receive lugs 86 and 88 respectively when the closure plate is extended across the bottom of the track members 18 and 19 as best illustrated in FIGURES 4, 6, and 7. The lugs 86 and 88 have heads 96 provided thereon so as to prevent the closure plate 90 from separating from the upper channel member 19. With such a construction it should be appreciated that when the upper track member is subjected to excessive or extreme loads that the closure plate 90 will prevent the sides or flanges provided on the channel member 19 from separating. Thus, the closure plate 90 maintains the same assembled relationship between the track members 18 and 19 at all times. Thus, when the track member is subjected to extreme load the bearing elements 50 and 52 will remain in its assembled relationship. The closure plate 90 is provided at the inner side thereof with a pair of downwardly extending lugs 100 and 102 which are spaced apart as best illustrated in FIGURE 4. The lugs 100 and 102 form stop surfaces for the latching device 104 as will be subsequently described. In addition, the closure plate includes an outwardly extending bracket 106.

Any convenient type of latching device 104 may be provided to hold the upper channel member 19 in an adjusted position relative to the lower channel member 18. As illustrated the latching device 104 comprises a latch plate 108 pivotally mounted on the closure plate 90, which is to be considered as a part of the upper channel member 19, by means of a pivot mounting 110. The latch plate 108 is provided with a pair of pawl elements 112 engagable with the rack teeth 114 provided on the bottom or lower surface of the elongated fixed support 20 intermediate the legs 21 and 22. A tension spring 120 is provided which extends between the bracket 106 provided on the closure plate 90 and the latch plate extension 122. The spring 120 continually urges and holds the latch plate 108 in latching position, with the pawl elements 112 in engagement with the rack teeth 114. A suitable hand lever 124 is provided when it is desired to retract the pawl elements 112 from the rack teeth 114 permitting the uper track member 19 to be adjusted lengthwise with respect to the lower track or channel member 18.

It should be observed that the teeth 114 are provided on the fixed support 20 while the latching device 104 is carried by the upper track member or slide 19. With such a construction when the seat 12 is in a latched position any emergency load on the slide 19 is carried directly to the elongated fixed support 20 and not through or to the lower track member 18. Thus it has been found that the rivets 54 are not subjected to the excessive shear stresses as heretofore when the seat is subjected to an emergency seat belt load. In other words the rivets 56 will not shear off when such a situation arises.

The hand lever 124 is usually provided only on the latch plate mounted on the slidable track unit 16, beneath the driver's side of the vehicle seat 12. The slidable track unit 14 mounted at the opposite side of the vehicle seat 12 may be provided with a similar latch plate, not shown, except that the latter is adapted to be actuated by remote control through the medium of a cable or other device not illustrated extending between it and the latch plate 108 operated by the hand lever or handle 124.

The seat adjuster mechanism operates in the same manner as prior art devices in that release of the latching device permits the seat 12 to be moved fore and aft. Once the locking device is released the pawl elements thereof engage the rack teeth so as to locate the seat 12 in a selected adjusted position.

The seat track of the present invention operates very smoothly and freely when unlocked for adjustment but which at the same time is arranged to be firmly locked in a position of longitudinal adjustment and tightly clamped against lateral movement. The important feature of the present invention is the provision of the closure plate which prevents the upper and lower channel members from separating from one another when under extreme or damaging load.

When the seat track assembly is under extreme load the closure plate 90 moves upwardly as viewed in FIGURES 6 and 7 to take up the relatively small gap or space 91 provided between the top surface of the plate 90 and the under side of the fixed support 20. This construction serves as an added safety feature to help prevent the flanges 40 and 42 from spreading apart.

The drawings and the foregoing specification constitute a description of the improved vehicle seat track construction for use with seat belts in such full, clear, concise and exact terms as to enable any person skilled in the art to practice the invention, the scope of which is indicated by the appended claims.

What I claim as my invention is:

1. In a seat track unit comprising an upper and a lower channel member, said upper channel member invertedly encompassing the lower channel member with their base portions in opposed spaced relationship, said members being provided with complementary laterally extending race forming flanges thereon, anti-friction rolling elements positioned between said flanges, said upper channel member being movable longitudinally with respect to said lower channel member, the flanges on said upper channel member extending downwardly beyond the bottom side of said lower channel member, and a laterally extending closure plate extending across the bottom of said channel members and fixedly secured to the flanges on said upper channel member, said closure plate forming a brace which prevents the flanges of said upper channel member from separating when said unit is subjected to excessive load so as to maintain said tracks in assembled relationship, said closure plate being movable with said upper channel member without any obstruction from said lower channel member.

2. In a seat track unit comprising an upper and a lower channel member, said upper channel member invertedly encompassing the lower channel member with their base portions in opposed spaced relationship, said members being provided with complementary laterally extending race forming flanges thereon, bearing means interposed between said flanges providing lateral bearing means between said channel members, a bearing element interposed between said base portions maintaining said channel members in vertical spaced relationship, said upper channel member being movable longitudinally with respect to said lower channel member, the flanges on said upper channel member extending downwardly beyond the bottom of said lower channel member, and a laterally extending closure plate extending across the bottom of said channel members and fixedly secured to the flanges on said upper channel member, said closure plate forming a brace which prevents the flanges of said upper channel member from separating when said unit is subjected to excessive load so as to maintain said tracks in assembled relationship, said closure plate being movable with said upper channel member without any obstruction from said lower channel member.

3. The seat track unit defined in claim 2 wherein latch means is carried by said closure plate engageable with said lower channel member to secure said members in selected adjusted position.

4. The seat track unit defined in claim 2 wherein said closure plate is spaced from the bottom of said lower channel member.

5. A sliding seat structure comprising an elongated fixed support having a pair of spaced apart downwardly extending flanges, an upwardly opening lower channel member fixedly mounted on the top surface of said fixed support, a downwardly opening upper channel member invertedly encompassing said lower channel member, each of said channel members having a base portion and a pair of flanges, the base portions of said members being in opposed spaced relationship, antifriction means provided between said members to permit lengthwise movement of said upper channel member with respect to said lower channel member, the pair of flanges on said support each having a plurality of downwardly opening notches therein, the flanges on said upper channel member including mounting lugs, a closure plate extending across the bottom of said channel members and fixedly secured to said mounting lugs, said closure plate forming a brace which prevents portions of the flanges of said upper channel member from separating when the seat structure is subjected to an excessive load so as to maintain said channel members in assembled relationship, and a latching element pivotally mounted on said closure plate, said latching element extending underneath and completely across all of said flanges and engageable with a pair of transversely aligned notches in the pair of flanges on said support to prevent horizontal displacement of said upper channel member.

6. A sliding seat structure comprising an elongated fixed support having a pair of spaced apart downwardly extending flanges, an upwardly opening lower channel member fixedly mounted on the top surface of said fixed support, a downwardly opening upper channel member invertedly encompassing said lower channel member, each of said channel members having a base portion and a pair of flanges, the base portions of said members being in opposed spaced relationship, antifriction means provided between said members to permit lengthwise movement of said upper channel member with respect to said lower channel member, the pair of flanges on said support each having a plurality of downwardly opening notches therein, the flanges on said upper channel member including mounting lugs, a closure plate extending across the bottom of said channel members and fixedly secured to said mounting lugs, said closure plate forming a brace which prevents portions of the flanges of said upper channel member from separating when the seat structure is subjected to an excessive load so as to maintain said channel members in assembled relationship, said closure plate being movable with said upper channel member, and a latching element pivotally mounted on said closure plate, said latching element extending underneath and completely across all of said flanges and engageable with a pair of transversely aligned notches in the pair of flanges on said support, said latching element when in latching engagement in the pair of aligned notches preventing horizontal displacement of said upper channel member.

7. A sliding seat structure comprising an elongated fixed support having a pair of spaced apart downwardly extending flanges, an upwardly opening lower channel member fixedly mounted on the top surface of said fixed support, a downwardly opening upper channel member invertedly encompassing said lower channel member, each of said channel members having a base portion and a pair of flanges, the base portions of said members being in opposed spaced relationship, antifriction means provided between said members to permit lengthwise movement of said upper channel member with respect to said lower channel member, the pair of flanges on said support each having a plurality of downwardly opening notches therein, the pair of flanges on said upper channel member including mounting lugs extending downwardly and terminating below the top surface of said support, a closure plate extending across the bottom of said channel members and fixedly secured to said mounting lugs, said closure plate forming a brace which prevents portions of the flanges of said upper channel member from separating when the seat structure is subjected to an excessive load so as to maintain said channel members in assembled relationship, said closure plate being movable with said upper channel member, and a latching element pivotally mounted on said closure plate, said latching element extending underneath and completely across all of said flanges and mounted for movement in a plane substantially parallel to said closure plate to engage a pair of transversely aligned notches in the pair of flanges on said support, said latching element when in latching engagement in the pair of aligned notches preventing horizontal displacement of said upper channel member, said closure plate and said latching element being spaced from and out of contact with said lower channel member.

References Cited by the Examiner
UNITED STATES PATENTS

| | | | |
|---|---|---|---|
| 2,352,358 | 6/44 | Andersen | 308—3.8 |
| 2,576,867 | 11/51 | Wilson | 297—389 |
| 2,715,433 | 8/55 | Dolgorukov | 308—6 X |
| 2,827,106 | 3/58 | Cramer et al. | 308—3.8 X |
| 2,900,036 | 8/59 | Blake. | |
| 2,919,744 | 1/60 | Tanaka | 248—429 X |
| 2,947,353 | 8/60 | Von Wimmersperg | 297—388 |
| 2,970,015 | 1/61 | Ragsdale | 308—6 |
| 3,001,835 | 9/61 | Kramer | 308—6 |

ROBERT C. RIORDON, *Primary Examiner.*

FRANK B. SHERRY, *Examiner.*